United States Patent [19]

Levine et al.

[11] Patent Number: 5,087,461
[45] Date of Patent: * Feb. 11, 1992

[54] DOUBLE-ENCAPSULATED COMPOSITIONS CONTAINING VOLATILE AND/OR LABILE COMPONENTS, AND PROCESSES FOR PREPARATION AND USE THEREOF

[75] Inventors: Harry Levine; Louise Slade, both of Morris Plains; Bernhard Van Lengerich, Ringwood; John G. Pickup, Randolph, all of N.J.

[73] Assignee: Nabisco Brands, Inc., Parsippany, N.J.

[*] Notice: The portion of the term of this patent subsequent to Apr. 23, 2008 has been disclaimed.

[21] Appl. No.: 415,866

[22] Filed: Oct. 2, 1989

[51] Int. Cl.$^5$ .............................. A23L 1/221
[52] U.S. Cl. ..................... 426/96; 426/103; 426/650; 426/651
[58] Field of Search ............... 426/96, 103, 650, 651

[56] References Cited

U.S. PATENT DOCUMENTS

| | | | |
|---|---|---|---|
| 2,809,895 | 10/1957 | Swisher | 99/140 |
| 2,856,291 | 10/1958 | Schultz | 99/140 |
| 2,857,281 | 10/1958 | Schultz | 99/140 |
| 2,919,989 | 1/1960 | Schultz | 99/140 |
| 3,041,180 | 6/1962 | Swisher | 99/140 |
| 3,314,803 | 4/1967 | Dame, Jr. | 99/140 |
| 3,554,768 | 1/1971 | Feldman | 99/140 |
| 3,704,137 | 11/1972 | Beck | 99/140 |
| 3,971,852 | 7/1976 | Brenner et al. | 426/103 |
| 4,232,047 | 11/1980 | Sair et al. | 426/96 |
| 4,532,145 | 7/1985 | Saleeb et al. | 426/651 |
| 4,610,890 | 9/1986 | Miller et al. | 426/651 |
| 4,689,235 | 8/1987 | Barnes et al. | 426/89 |
| 4,707,367 | 11/1987 | Miller et al. | 426/96 |
| 4,820,534 | 4/1989 | Saleeb et al. | 426/96 |

OTHER PUBLICATIONS

Levine, H. and Slade, L., 1986, "A Polymer Physico--Chemical Approach to the Study of Commercial Starch Hydrolysis Products (SHPs)", *Carbohydrate Polymers*, (6), pp. 213-244.

Marcus Karel and Robert Langer, 1988, "Controlled Release of Food Additives," Appendix II, *Flavor Encapsulation*, pp. 177-191.

Risch, "Encapsulation of Flavor by Extrusion", Chap. 11, *Flavor Encapsulation*, (1988), pp. 103-109.

Marcus Karel, "Critical Review of Microencapsulation of Food Additives," Aug. 3, 1988.

*Primary Examiner*—Donald E. Czaja
*Assistant Examiner*—John C. Mowbray

[57] ABSTRACT

A spray-dried composition comprising a volatile and/or labile component in a carrier, is further encapsulated in an extruded glassy matrix comprising:

(a) from about 40 to about 80 percent by weight of a water-soluble, chemically-modified starch having a dextrose equivalent not greater than about 2;
(b) from about 10 to about 40 percent by weight of a maltodextrin having a dextrose equivalent in the range of from about 5 to about 15;
(c) from about 5 to about 20 percent by weight of corn syrup solids or a polydextrose having a dextrose equivalent in the range of from about 21 to about 42; and
(d) from about 5 to about 20 percent by weight of a mono- or disaccharide.

The resultant glassy matrices are useful for introducing and/or retaining and/or stabilizing the volatile and/or labile components in cooked and uncooked food products.

57 Claims, 1 Drawing Sheet

DOUBLE-ENCAPSULATED COMPOSITIONS CONTAINING VOLATILE AND/OR LABILE COMPONENTS, AND PROCESSES FOR PREPARATION AND USE THEREOF

FIELD OF THE INVENTION

This invention relates to double-encapsulated compositions containing volatile and/or labile components, and to processes for the preparation and use thereof. These double-encapsulated compositions are useful for incorporating, retaining and stabilizing the volatile and/or labile components, especially flavoring agents, into cooked and uncooked food products, especially baked goods.

BACKGROUND OF THE INVENTION

It has long been known to skilled persons in the food industry that the taste and aroma of food products are greatly affected by volatile components present in such products. For example, such components as coffee aroma, esters, acetaldehyde, various essential oils, sulfur compounds and flavorings such as vanilla, augment and enhance the perceived taste and smell of a variety of food products. Consequently, to ensure the production of food products which are of consistent quality and are attractive to consumers, it is necessary to ensure that each batch of product contains a proper, predetermined amount of such volatile components.

However, because of the volatility of these components, it is not easy to ensure that the predetermined amount of each volatile component is present in the final product as it reaches the consumer. Losses of volatile components may occur during storage prior to incorporation of the component into the food product, during the mixing of the component with the other ingredients of the food product, during baking or other cooking of the food product, during the transportation and storage involved in bringing the product to the ultimate consumer, and in some cases during the final preparation of the food product by the consumer, for example by reheating or microwaving of the food product. The extent of many of these losses are difficult to control; for example, there may be a considerable time period between the beginning and the end of the use of a batch of volatile component in a plant, so some of the batch may be in storage for far longer than another part of the same batch, while the period which elapses between the time a product leaves the plant and the time it reaches a consumer is out of the manufacturer's control.

These variations in losses of volatile components from food products may produce undesirable variations in the taste and aroma of the products as perceived by the consumer. In addition, such losses of volatile components increase the cost of the food product, since it is necessary to increase the amount of the volatile component included in the food product to compensate for the losses which occur, and many volatile components (for example, vanilla and some essential oils) are expensive.

The problems associated with volatile components are also experienced with labile components used in foods; the term "labile" is used herein to denote a material which, because of its interaction with materials present in the environment, gradually undergoes degeneration and destruction during storage. An example of a labile component is acetaldehyde, which is slowly destroyed by atmospheric oxygen.

To reduce or eliminate the aforementioned problems associated with volatile and/or labile components, attempts have been made to encapsulate such components in a matrix which reduces the volatility and/or lability of the component. Frequently, the matrix used is composed of one or more carbohydrates.

U.S. Pat. No. 2,809,895, to Swisher describes a process for encapsulation of an essential oil, such as lemon, lime or grapefruit oils, in a matrix comprising corn syrups, antioxidant and a dispersing agent. The essential oil, antioxidant and dispersing agent are added to the corn syrup, the resultant mixture is heated to 85°-125° C. and agitated or extruded to form an emulsion in pellet form, and the resultant particles are washed with an essential oil solvent and dried under vacuum to remove the solvent.

U.S. Pat. Nos. 2,856,291 and 2,857,281, both to Schultz, describe a process for the encapsulation of flavorants (for example, citrus oils) in a sugar base comprising sucrose, corn syrup and water. A hot emulsion of the flavorant is formed in the sugar base, and this emulsion is extruded as a stream or as globules, cooled to a plastic condition and cut into rods.

U.S. Pat. No. 2,919,989, also to Schultz, describes a modification of the process of the aforementioned U.S. Pat. No. 2,856,291 in which the sugar base used comprises, by weight, 15-40% sucrose, 10-15% lactose, 5-14% maltose, 10-50% dextrose and not more than 15% dextrin.

U.S. Pat. No. 3,041,180 to Swisher describes an essential oil flavoring composition produced by mixing glycerol and 42 DE corn syrup solids into an aqueous, semi-plastic mass, which is then combined with the essential oil by means of an emulsifier. The resulting mixture is extruded into a cold solvent to form an extruded solid in which the essential oil is encapsulated by the glycerol and corn syrup solids. This extruded solid is then dried and an anti-caking agent added to produce an extruded particulate solid having an extended shelf life.

U.S. Pat. No. 3,314,803 to Dame et al. describes a method for fixing a volatile flavor such as acetaldehyde in a mannitol substrate. The acetaldehyde is fixed in mannitol by first forming a solution of mannitol and water, preferably a supersaturated solution of mannitol of between 25-45% by weight. The supersaturated solution is formed by heating with agitation 2 to 10 parts by weight of mannitol with 10 parts by weight of water at 180°-212° F. until all of the mannitol is dissolved in the water and no mannitol crystals remain in the solution. The solution is then cooled while acetaldehyde is added thereto. A controlled reflux admixes the volatile and the solution is then spray-dried.

U.S. Pat. No. 3,554,768 to Feldman describes a method for fixing acetaldehyde in selected carbohydrates; in this method, the acetaldehyde and the carbohydrate are uniformly mixed in water and the resultant mixture is dried to form a flavor-enhancing composition.

U.S. Pat. No. 3,704,137 to Beck describes an essential oil composition formed by mixing oil with an antioxidant, separately mixing water, sucrose and hydrolyzed cereal solids (dextrose equivalent (DE) substantially below 20, and preferably between 10 and 15), emulsifying the two mixtures together, extruding the resultant mixture in the form of rods into a solvent, removing excess solvent and finally adding an anti-caking agent, preferably silica.

U.S. Pat. No. 3,971,852 to Brenner describes a process for encapsulating an oil in a matrix comprising a polysaccharide (which may be dextrinized starch or hydrolyzed starch having a DE of 10-25) and a polyhydroxy material, which can be glucose, maltose or fructose. The ingredients are emulsified and spray dried.

U.S. Pat. No. 4,532,145 to Saleeb describes a process for fixing volatile components in an amorphous substrate to produce a moisture-stable product. In this process, a low (90-500) molecular weight water-soluble material, such as a monosaccharide or disaccharide, having a melting point of from 80° to 180° C., is mixed with a high (1000-6000) molecular weight water-soluble polymeric material, such as a polysaccharide, in an aqueous solution. A volatile flavorant, such as acetaldehyde, is added to this solution, and the resultant mixture is spray-dried at a temperature of from 100° to 180° C. at the inlet and from 50° to 80° C. at the outlet.

U.S. Pat. No. 4,820,534 to Saleeb et al. describes a method for fixing volatile flavorants in an extruded glass substrate which uses a matrix generally similar to that of U.S. Pat. No. 4,532,145 described above, but in which the mixture of flavorant and carbohydrates is heated above the glass transition temperature of the substrate and at or just above the melting point of the minor ingredient (the monosaccharide or disaccharide) so that the minor ingredient melts and the major ingredient (the polysaccharide) dissolves in the minor ingredient to form a molten mass, and this molten mass is extruded to produce an amorphous, homogeneous, single-phase glass containing entrapped volatile flavorant, this glass having a glass transition temperature above ambient temperature.

U.S. Pat. Nos. 4,610,890 and 4,707,367, both to Miller, describe a process for preparing a solid essential oil composition having a high content of the essential oil. This composition is prepared by forming an aqueous solution containing a sugar, a starch hydrolyzate and an emulsifier. The essential oil is blended with this aqueous solution in a closed vessel under controlled pressure conditions to form a homogeneous melt, which is then extruded into a relatively cold solvent, dried and combined with an anti-caking agent.

U.S. Pat. No. 4,689,235 to Barnes describes a process which involves generally the same steps as in the aforementioned U.S. Pat. No. 4,610,890 but in which the solution used for encapsulation comprises a mixture of a maltodextrin and hydrogen octenyl butanedioate.

One of the problems in such prior art methods for the encapsulation of volatile and/or labile components in carbohydrate matrices is the difficulty of securing a sufficiently high glass transition temperature for the glassy matrices. Although the glassy carbohydrate matrices do not have a sharp melting point characteristic of crystalline solids, they do have a glass transition temperature (also known as softening temperature), which is the temperature at which the amorphous solid matrix softens and becomes a viscous liquid.

When a glassy matrix containing an encapsulated volatile component is heated above its glass transition temperature, the encapsulated material is released by diffusion at a rate which increases with increase of temperature above the glass transition temperature. Even below the glass transition temperature, the stability of the matrix increases (and thus the loss of volatile component decreases) with the difference between the temperature of the matrix and its glass transition temperature. Thus, it is desirable to use a matrix material having a glass transition temperature well above the temperature at which the encapsulated material will be stored and used.

Another problem in such prior art methods for the encapsulation of volatile and/or labile components in carbohydrate matrices is the hygroscopic nature of the matrices produced. Since the glassy matrices are plasticized and solubilized by water as well as softened by heat, it is important that the matrix not come into contact with water, which would permit escape of the volatile component from the matrix. The hygroscopic nature of some prior art matrices requires special precautions to prevent plasticization of the matrix by atmospheric moisture; since, under industrial conditions, it is usually impossible to keep the matrices under completely anhydrous conditions, many prior art compositions require the use of anti-caking agents to prevent caking caused by plasticization of the matrix by moisture adsorbed from the air.

Flavoring compositions comprising a flavoring agent such as a liquid vanilla flavor encapsulated by spray-drying with a maltodextrin carrier are commercially available and are used for introducing the flavoring agent into foodstuffs. In addition to the aforementioned problems, it has been found that these encapsulated products are less effective than is desirable in preventing loss of the volatile flavorant when used in foodstuffs such as cookies, which require addition of the spray-dried compositions to a dough which is subject to extensive manipulation before the production of the final cookie. It appears that the walls of the microcapsules in the spray-dried encapsulated products are so fragile that they rupture easily during manipulation of the dough, and the flavoring agent released by the ruptured microcapsules can then act like an unencapsulated flavoring agent, with resultant loss of flavoring agent, etc.

It has now been found that the problems associated with the use of spray-dried encapsulated flavoring compositions in cookies and other foodstuffs can be eliminated, or at least significantly reduced, by a further encapsulation of the flavoring composition in a glassy matrix which has a high glass transition temperature and which is sufficiently non-hygroscopic that anti-caking agents are not normally required to be used.

SUMMARY OF THE INVENTION

This invention provides a process for encapsulation of a spray-dried solid composition comprising at least one volatile and/or labile component in a carrier, which process comprises forming a mixture of the composition with:

(a) from about 40 to about 80 percent by weight of a water-soluble, chemically-modified starch having a dextrose equivalent not greater than about 2;

(b) from about 10 to about 40 percent by weight of a maltodextrin having a dextrose equivalent in the range of from about 5 to about 15;

(c) from about 5 to about 20 percent by weight of corn syrup solids or a polydextrose having a dextrose equivalent in the range of from about 21 to about 42; and (d) from about 5 to about 20 percent by weight of a mono- or disaccharide, all of said percentages being based upon the total weight of the components (a), (b), (c) and (d);

and extruding the mixture to form a glassy matrix wherein the volatile and/or labile component is encapsulated.

In a preferred embodiment of this process:

component (a) comprises from about 50 to about 70 percent by weight of the mixture and is a succinyl starch derivative;

component (b) comprises from about 15 to about 30 percent by weight of the mixture and is a maltodextrin having a dextrose equivalent in the range of from about 8 to about 12;

component (c) comprises from about 7 to about 15 percent by weight of the mixture and is corn syrup solids having a dextrose equivalent in the range of from about 21 to about 30;

component (d) comprises from about 7 to about 15 percent by weight of the mixture and is a disaccharide;

the at least one volatile and/or labile component is present in the mixture in an amount of from about 2 to about 15 percent by weight of the total weight of components (a), (b), (c) and (d); and the glassy matrix formed has a glass transition temperature of at least about 40° C.

This invention also provides a glassy matrix comprising:

(a) from about 40 to about 80 percent by weight of a water-soluble, chemically-modified starch having a dextrose equivalent not greater than about 2;

(b) from about 10 to about 40 percent by weight of a maltodextrin having a dextrose equivalent in the range of from about 5 to about 15;

(c) from about 5 to about 20 percent by weight of corn syrup solids or a polydextrose having a dextrose equivalent in the range of from about 21 to about 42;

(d) from about 5 to about 20 percent by weight of a mono or disaccharide; and (e) a spray-dried composition containing at least one volatile and/or labile component in a carrier, all of these percentages being based upon the total weight of the components (a), (b), (c) and (d).

Finally, this invention provides a process for incorporation of a spray-dried composition comprising at least one volatile and/or labile component in a carrier into a cooked food product, which process comprises:

forming a mixture of a spray-dried composition containing the at least one volatile and/or labile component with:

(a) from about 40 to about 80 percent by weight of a water-soluble, chemically-modified starch having a dextrose equivalent not greater than about 2;

(b) from about 10 to about 40 percent by weight of a maltodextrin having a dextrose equivalent in the range of from about 5 to about 15;

(c) from about 5 to about 20 percent by weight of corn syrup solids or a polydextrose having a dextrose equivalent in the range of from about 21 to about 42; and (d) from about 5 to about 20 percent by weight of a mono- or disaccharide, all of these percentages being based upon the total weight of the components (a), (b), (c) and (d);

extruding the mixture to form a glassy matrix wherein the spray-dried composition containing at least one volatile and/or labile component is encapsulated;

adding the glassy matrix to the remaining ingredients of the food product; and cooking the resultant mixture to form the cooked food product.

BRIEF DESCRIPTION OF THE DRAWING

The sole FIGURE of the accompanying drawing is a graph showing the relationship between glass transition temperature and number average molecular weight for various carbohydrates.

DETAILED DESCRIPTION OF THE INVENTION

Figure 1:
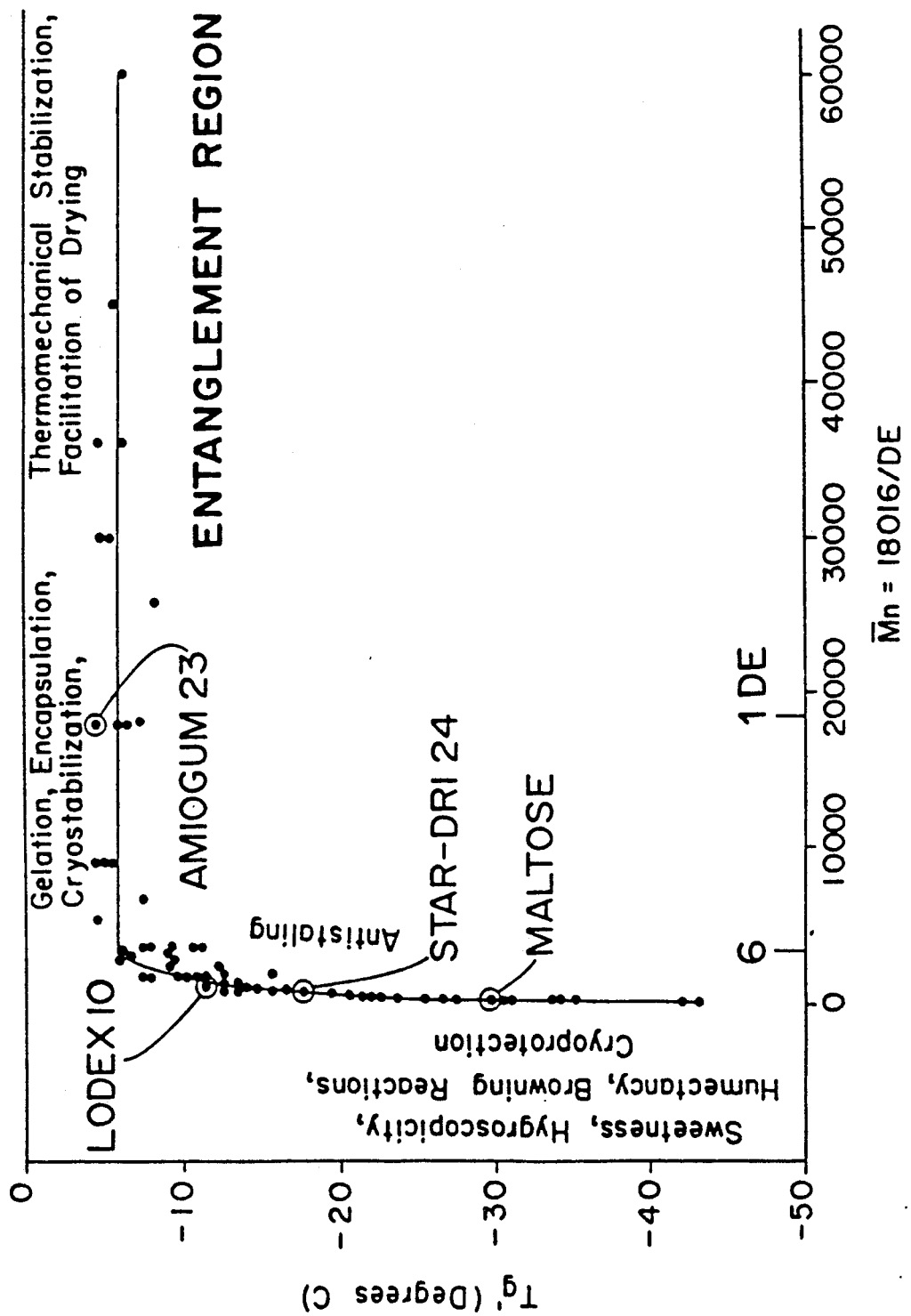

As already stated, in the process of the present invention, a spray-dried composition comprising at least one volatile component in a carrier (typically a carbohydrate or gum carrier), and in the form of an amorphous powder, is further encapsulated in a glassy matrix formed from a mixture of four different carbohydrates.

The first of these carbohydrates, which comprises from about 40 to about 80, and preferably about 50 to about 70, percent by weight of the mixture, is a water-soluble, chemically-modified starch having a dextrose equivalent (DE) below about 2. Preferred starch derivatives are succinyl starch derivatives, the derivatives of starch with octenyl succinate being especially preferred. Desirably, the starch derivative has a dextrose equivalent in the range of about 0.5 to about 1.5. Starch derivatives suitable for use in the present process are readily available commercially; one specific commercial product which has been found to give good results in the present process is that sold as Amiogum 23 by American Maize-Products Co., Hammond, Ind. (Neither the molecular weight nor the dextrose equivalent of this material is specified by the manufacturer. However, using routine methods for determination of molecular weight of carbohydrates which will be familiar to those skilled in the art, it has been found that $M_n$, the number average molecular weight of this material is approximately 18,000, which corresponds to a DE of 1, since $DE = 18016/M_n$.) The starch derivative used must be water-soluble; natural starches are insufficiently soluble for use in the process of the present invention and do not produce a satisfactory glassy matrix which will dissolve rapidly in the mouth of the consumer (see below) to give quick release of the volatile and/or labile component.

The second of these carbohydrates, which comprises from about 10 to about 40, and preferably about 15 to about 30, percent by weight of the mixture, is a maltodextrin having a dextrose equivalent (DE) in the range of about 5 to about 15. Preferred maltodextrins are those having a DE in the range of about 8 to about 12. As those skilled in the food industry are well aware, a variety of maltodextrins meeting these requirements are readily available commercially; one specific maltodextrin which has been found to give good results in the present process is that sold as Lodex 10 by American Maize-Products Co., Hammond, Ind. This material has a DE of 10, corresponding to a number average molecular weight of approximately 1800.

The third of these carbohydrates, which comprises from about 5 to about 20, and preferably about 7 to about 15, percent by weight of the mixture, is corn syrup solids or a polydextrose having a dextrose equivalent in the range of about 21 to about 42. Preferred corn syrup solids are those having a DE in the range of about 21 to about 30. Again, it is well known that corn syrup solids meeting these requirements are readily available commercially; one specific corn syrup solids which has been found to give good results in the present process is that sold as Star-Dri 24 by A. E. Staley Manufacturing Co., Decatur, Ill. This material has a DE of 24, corresponding to a number average molecular weight of approximately 750.

The term "corn syrup solids" is conventionally used to denote the mixture of carbohydrates produced by hydrolysis of corn starch and having dextrose equivalents in the range of 21 to 42. However, although such carbohydrates are usually produced by hydrolysis of high molecular weight starch, any carbohydrates having the required dextrose equivalents may be employed in the matrices of the present invention. In particular, such carbohydrates may be produced by polymerization of lower molecular weight carbohydrates rather than hydrolysis of high molecular weight starches. "Polydextrose", produced commercially be Pfizer, is the trade name for a glucose oligomer having a glass transition temperature comparable to that of medium dextrose equivalent corn syrup solids, and such polydextrose may be employed in place of corn syrup solids in the present matrices.

The fourth and last of these carbohydrates, which comprises from about 5 to about 20, and preferably about 7 to about 15, percent by weight of the mixture, is a mono- or disaccharide. This carbohydrate may be, for example, sucrose, glucose, lactose, fructose or maltose. In general, disaccharides are preferred over monosaccharides because the higher molecular weight of the disaccharides gives them a higher glass transition temperature and a lower hygroscopicity. Among the disaccharides, maltose is preferred over sucrose, because maltose, as the crystalline monohydrate, melts in an extruder at a much lower temperature than does sucrose.

The spray-dried encapsulated composition which is further encapsulated by the process of the present invention may be any spray-dried composition comprising a volatile and/or labile component, provided that the spray-dried composition has a sufficiently small particle size to be encapsulated by the process of the present invention. The carrier of the spray-dried composition may be, for example, a dextrin, a maltodextrin, a cyclodextrin, a sugar, a protein, a gum, such a gum arabic, or any combination thereof.

It has previously been shown (see Levine and Slade, A Polymer Physico-Chemical Approach to the Study of Commercial Starch Hydrolysis Products (SHPs), Carbohydrate Polymers, 6, 213-344 (1986)) that the characteristic sub-zero glass transition temperature, $T'_g$, of a maximally freeze-concentrated aqueous solution of a carbohydrate or mixture of carbohydrates shows an inverse linear correlation with the dextrose equivalent of the carbohydrate over a DE range of 0.3 to 100; in experiments reported in this paper, the coefficient of correlation between $T'_g$ and DE was $-0.98$, in effect indicating that virtually all the variation in $T'_g$ was due to variation in DE. The accompanying drawing, which is a modified reproduction of one of the Figures from this paper, shows the variation of $T'_g$ with number average molecular weight and DE of the carbohydrates. A similar relationship exists for variation of $T_g$, the conventional glass transition temperature, with number average molecular weight. Although the mixtures of carbohydrates used in the process of the present invention are more complex than those tested in the aforementioned paper, it has been found that they display the same correlation between glass transition temperature and number average molecular weight. Consequently, it is possible to calculate, with a high degree of accuracy, the glass transition temperature of the glassy matrix produced from any given carbohydrate mixture by the process of the present invention by calculating the number average molecular weight of the mixture (provided that due allowance is made for the water content of the mixture, as discussed in more detail below).

It should be noted that one reason for the higher glass transition temperatures of the matrices of the present invention, as compared with the prior art matrices discussed above, is the high proportion of modified starch used in the present matrices, and the increased number average molecular weight of the matrix that this high proportion of starch provides. Although water-soluble, chemically-modified starches have been used in prior art glassy matrices, such starches have typically been used in amounts of 20 percent by weight of the matrix-forming ingredients, in contrast to the 40 to 80 percent by weight of the components used in the matrices of the present invention.

The glass transition temperature of the matrices of the present invention declines sharply with increasing water content in the matrix. Accordingly, the water content of the matrix should be kept as low as possible. However, the extrudability of the mixture of carbohydrates used to form the matrix declines with decreasing water content, and if the water content of the mixture is too low, the extruder may clog or generate heat sufficient to cause undesirable changes in the matrix formed. Accordingly, the optimum water content for extrusion of any particular mixture is a compromise between the glass transition temperature of the matrix to be produced and the extrudability of the mixture. The optimum water content for any specific mixture can readily be determined by routine empirical tests, which will be familiar to those skilled in carbohydrate chemistry. In general, however, it has been found that if the moisture content of the carbohydrate mixture (including the moisture which is inevitably present in carbohydrates either as water of crystallization or as otherwise adsorbed water), as determined by overnight drying in an oven at 70° C., falls below about 9-10 percent by weight, extrusion of the mixture tends to become difficult or impossible. If the carbohydrate components of the matrix are used in a "dry" state, i.e. with no apparent moisture present on the carbohydrate, each carbohydrate will usually contain about 5-10 percent by weight of water. Accordingly, it is usually necessary to add some water to the carbohydrate mixture to assist in the extrusion of the matrix; the amount of water is usually preferred to be within the range of from about 2 to about 7 percent by weight based upon the total weight of said components (a), (b), (c) and (d). Desirably, the moisture content of the final glassy matrix is in the range of from about 5 to about 11 percent by weight.

The particle size of the various carbohydrates used to form the glassy matrices does not appear to be critical; use of the normal commercial forms of the various carbohydrates has been found to give satisfactory results, and maltose may conveniently be used in the form of the monohydrate. However, care should of course be taken to ensure that the ingredients do not contain particles so large as to introduce significant heterogeneities into the glassy matrix; accordingly, it may be desirable to sieve the various ingredients before they are mixed.

To form the mixture of ingredients which will be extruded to form the glassy matrix, no special mixing techniques are required; the various ingredients are simply added to a mixer (for example, a Hobart mixer), and mixed gently until a homogeneous mixture is obtained. Care should be taken to ensure gentle mixing, since excessive shear strains and resultant fracture of the fragile walls of the microcapsules of the spray-dried encapsulated composition should be avoided as far as possible. In general, it is not necessary to add any drying agents to the mixture.

When the addition of water is needed for proper extrusion of the mixture, this water is conveniently added directly to the extruder, in a manner which will be familiar to those skilled in extruder technology. However, if desired, the water may be added to the carbohydrate mixture before extrusion.

The extrusion of the dry mixture to form the glassy matrix requires close control because of the inherent difficulty of extruding a powdered composition. As already stated, in many cases it may be desirable to add a limited amount of water during extrusion, provided too high a moisture content in the final glassy matrix is avoided. Both single and twin screw extruders may be used, but the screw speed should be carefully regulated to prevent the development of excessive pressures and temperatures which might produce an unsatisfactory matrix; the necessary adjustments can easily be made empirically by persons skilled in the operation of extruders. Generally, extruder temperatures should lie within the range of about 35° to about 150° C., since exposure to higher temperatures tends to produce undesirable damage to the carbohydrates and a less satisfactory matrix. It has been found desirable to use extruders which are capable of providing multiple zones with differing temperatures; in a preferred embodiment of the invention, the first of the temperature zones, adjacent the input of the extruder, has a temperature in the range of from about 35° to about 50° C. and the last of the temperature zones, from which the extrudate leaves the extruder, has a temperature in the range of from about 80° to about 125° C.

The present glassy matrices are produced by extrusion rather than by spray-drying, because it has been found that the thermal stability of the extruded products produced from any given carbohydrate mixture is much greater than that of the corresponding spray dried product.

The physical dimensions of the extrudate are not critical, and may vary depending upon its intended use. However, when the extrudate contains a flavoring material intended for use in foodstuffs, it has been found convenient to produce the extrudate in the form of narrow rods having a diameter in the range of 0.3 to 3 mm., and desirably about 1 mm. Furthermore, in order to produce a uniform flavor throughout the foodstuff, it is desirable to grind the extrudate, generally to below 40 U.S. mesh.

The encapsulated volatile and/or labile components produced by the process of the present invention can be used in any application where the unencapsulated components have hitherto been used. However, the encapsulated components are especially useful for introducing, retaining and stabilizing flavoring materials in foodstuffs. The encapsulate components are released very slowly, if at all, from the glassy matrix while the foodstuff is being stored at temperatures close to room temperature. However, when a consumer bites into the flavored foodstuff, the glassy matrix is plasticized or dissolved immediately by the water present in the consumer's mouth, with consequent immediate release of the flavoring components. Thus, the flavoring components are released only at the time they are needed for full flavor impact. This enables one either to produce an improved flavor impact using the same amount of flavoring components, or to reduce the amount of flavoring components (many of which are expensive) while still producing the same flavor impact in the foodstuff.

The encapsulated volatile and/or labile components produced by the process of the present invention can be used, and indeed are especially intended for use, in foodstuffs which are subjected to cooking, including baking; the encapsulated components can, however, also be used in uncooked foodstuffs. Although the glassy matrix will normally be subjected to temperatures above its glass transition temperature during the cooking of the foodstuff, and will thus be at least partially liquified, it has been found that in practice such cooking does not result in major loss of the volatile and/or labile components. This may be attributed to the fact that, when the glassy matrices produced by the present process are heated above their glass transition temperatures, the liquid produced is highly viscous and viscoelastic ("rubbery"), in contrast to the low viscosity, non-viscoelastic liquids produced by matrices formed from low molecular weight saccharides (e.g., sucrose glasses). The high viscosity and viscoelasticity of the liquified matrix is due to the high proportion of modified starch therein. Because of its high molecular weight and long chain length, the modified starch undergoes intermolecular entanglement in the molten mixture. The entanglement persists in the glassy matrix formed below the glass transition temperature (so reducing diffusion of the encapsulated component out of the glassy matrix during storage of the matrix below its glass transition temperature) and in the viscoelastic liquid formed above the glass transition temperature, and causes the rubbery character and reduced diffusivity of the viscoelastic liquid formed above the glass transition temperature.

The high viscosity and viscoelasticity of the liquified matrix hinders diffusion of the volatile and/or labile components out of the rubbery liquid. Furthermore, it is believed (although the invention is in no way limited by this belief) that the lower molecular weight carbohydrates in the glasses and rubbery liquids produced from the present matrices (i.e, the mono- and/or disaccharides and the corn syrup solids) in effect plug the molecular-level voids or holes between the long, entangled chains of the starch derivative, thereby further hindering diffusion of the volatile and/or labile components out of the glass or rubbery liquid. Certainly, diffusion of the volatile and/or labile components out of the liquids produced from the present glassy matrices is slower than from a matrix comprising only modified starch.

In general, it is not necessary to take any special precautions when using the encapsulated compositions of the present invention; these compositions are employed in exactly the same manner as the spray-dried encapsulated volatile and/or labile components which they contain, although of course due regard must be had to changes in the physical form of the compositions. For example, when an encapsulated composition of the present invention is to be used in a baked good, it is usually only necessary to add the composition to the other ingredients of the dough or batter used to prepare the baked good.

The present process may be employed for encapsulation of a wide variety of already-encapsulated volatile and/or labile components. Examples of such components include flavoring components such as vanilla, vanillin, orange, chocolate, coffee, cocoa and butter flavorings and instant tea. The process can also be used to encapsulate aromatic materials, both those which convey desirable aroma (for example cinnamon) and those which have an undesirable odor which it is desired to mask, for example fish oils. The process can also be used to encapsulate coloring materials, especially food colors, and other materials which are subject to degradation during normal storage, for example vitamins (some of which are subject to atmospheric oxidation) and leavening agents (which may react prematurely); thus, for example, the present invention may be employed to encapsulate vitamins used to fortify various foodstuffs. The encapsulated compositions of the invention may be employed, inter alia, in puddings, desserts, cakes, cookies and butter substitutes. The encapsulated compositions may also be employed in foodstuffs which are not cooked prior to consumption, for example chewing gum and cold breakfast cereals.

The following Examples are given, though by way of illustration only, to show details of compositions, methods and techniques used in the process of the present invention. Unless otherwise stated, all parts are by weight.

EXAMPLE 1

This Example illustrates the encapsulation of a spray-dried encapsulated "butter vanilla" flavor by the process of the present invention, and the use of the resultant double-encapsulated flavor in the preparation of a butter vanilla cookie.

The ingredients used to prepare a glassy matrix of the invention were as follows:

| Ingredients | Parts by weight |
| --- | --- |
| Succinyl modified starch | 15.0 |
| Maltodextrin (DE 10) | 5.0 |
| Corn syrup solids (DE 24) | 2.5 |
| Maltose monohydrate (DE 50) | 2.5 |
| Encapsulated butter vanilla flavor | 0.82 |
| TOTAL | 25.82 |

All of the above ingredients were placed in a Hobart mixing bowl and mixed with a paddle for 30 minutes at low speed. The resultant homogeneous mixture was found not to suffer from bridging problems when fed to the hopper of an extruder, and consequently there was no need to add any drying or anti-caking agents to the mixture.

The mixture was then extruded using a commercial twin-screw extruder having five temperature zones set to temperatures of 40°, 91°, 120°, 101° and 102° C. respectively from the inlet to the outlet of the extruder. Water was fed to the extruder at a rate of less than 0.05 parts by weight per part by weight of the dry mixture, and the die used contained 20 circular apertures each 1 mm. in diameter. This extrusion produced an amorphous "melt" at a temperature of 102° C. at its exit from the extruder. This amorphous melt had a glass transition temperature of approximately 50° C. The product became a glass (i.e., a completely amorphous solid) upon cooling to room temperature, as shown by its differential scanning calorimeter thermogram. The glassy matrix had a moisture content of approximately 11 percent by weight, as measured by heating to 70° C. in a vacuum oven for 12 hours; this "moisture content" measurement of course overstates the actual moisture content of the extrudate, since it includes loss of the volatile flavor components. The glassy matrix was then ground and passed through a 40 U.S. mesh sieve.

The glassy matrix thus produced was used in the preparation of butter vanilla cookies. The ingredients used to prepare the cookies were as follows:

| Ingredients | Parts by weight |
| --- | --- |
| Flour | 300 |
| Sugar | 132 |
| Butter and shortening | 150 |
| Non-fat dry milk | 9 |
| High fructose corn syrup | 15 |
| Minor ingredients (salt, sodium bicarbonate, calcium phosphate, ammonium bicarbonate, dry eggs) | 15.16 |
| Water | 45 |
| TOTAL | 666.16 |

Two separate batches of cookies were prepared, the batches differing only in the flavoring used. The first batch was a control batch in which the flavoring was 0.40 parts by weight of a liquid, non-encapsulated vanilla flavoring. In the second batch of cookies, the flavoring was 15.68 parts by weight of the butter vanilla flavor-containing glassy matrix, which provided the same total weight of vanilla flavoring as in the first (control) batch.

Both batches of cookies were prepared in the following manner. The sugar, non-fat dry milk, salt, dry eggs, shortening and butter were placed in a Hobart mixer and mixed with a paddle at high speed. The ammonium bicarbonate was then added in solution in the water, together with the high fructose corn syrup, and the resultant mixture mixed at medium speed. The flavoring was then added; in the case of the first batch of cookies, in which only liquid flavoring was used, the mixture was mixed for two minutes at high speed following addition of the flavoring, whereas in the other batch of cookies, in which the solid flavoring was used, the mixture was mixed for three minutes at high speed. Finally, the flour and the calcium phosphate were added and the mixture mixed at slow speed.

The dough thus produced was kneaded by hand and portions of 25 grams were used to make each cookie. The cookies were baked for 9 to 10 minutes at a temperature of 36° F.

Informal taste tests indicated that the cookies formulated with the double-encapsulated flavoring composition of the present invention had a taste at least as good as (i.e., stronger butter vanilla flavor than) that of the control cookies.

EXAMPLE 2

This Example illustrates the encapsulation of a spray-dried encapsulated mustard flavor by the process of the present invention.

Example 1 was repeated except that the butter vanilla flavor was replaced by 2.8 parts by weight of a commercial spray-dried mustard spice mix, and that the temperature of that last zone of the extruder (nearest the outlet) was kept in the range of 90°-100° F. The double-encapsulated composition was produced in the form of rods 1 mm. in diameter, which were then ground and passed through a 40 U.S. mesh sieve to produce a pulverulent mustard spice flavor composition suitable for use in flavoring a pretzel batter. The glassy extruded rods had a Tg of 52° C. and a moisture content of 8.2% by weight.

Processes and compositions generally similar to those of the present invention, but using as starting material pre-encapsulated volatile and/or labile components, are described and claimed in copending U.S. application Ser. No. 07/415,867, U.S. Pat. No. 5,009,900 by the present inventors, filed Oct. 2, 1989, and entitled "Glassy Matrices Containing Volatile and/or Labile Components, and Processes for Preparation and Use Thereof."

What is claimed is:

1. A process for encapsulation of a spray-dried composition comprising at least one volatile and/or labile component in a carrier, which process comprises forming a mixture of said composition with:
   (a) from about 40 to about 80 percent by weight of a water-soluble, chemically-modified starch having a dextrose equivalent not greater than about 2;
   (b) from about 10 to about 40 percent by weight of a maltodextrin having a dextrose equivalent in the range of from about 5 to about 15;
   (c) from about 5 to about 20 percent by weight of corn syrup solids or a polydextrose having a dextrose equivalent in the range of from about 21 to about 42; and
   (d) from about 5 to about 20 percent by weight of a mono-or disaccharide,
   all of said percentages being based upon the total weight of said components (a), (b), (c) and (d);
   and extruding the mixture to form a glassy matrix having a glass transition temperature of at least 40° C. wherein the volatile and/or labile component is encapsulated.

2. A process according to claim 1 wherein component (a) is present in an amount of from about 50 to about 70 percent by weight.

3. A process according to claim 1 wherein component (a) is a succinyl starch derivative.

4. A process according to claim 1 wherein component (a) is a derivative of starch with octenyl succinate.

5. A process according to claim 1 wherein component (a) has a dextrose equivalent in the range of about 0.5 to about 1.5.

6. A process according to claim 1 wherein component (b) is present in an amount of from about 15 to about 30 percent by weight.

7. A process according to claim 1 wherein component (b) has a dextrose equivalent in the range of about 8 to about 12.

8. A process according to claim 1 wherein component (c) is present in an amount of from about 7 to about 15 percent by weight.

9. A process according to claim 1 wherein component (c) has a dextrose equivalent in the range of about 21 to about 30.

10. A process according to claim 1 wherein component (d) is present in an amount of from about 7 to about 15 percent by weight.

11. A process according to claim 1 wherein component (d) comprises a disaccharide.

12. A process according to claim 11 wherein component (d) consists essentially of maltose.

13. A process according to claim 1 wherein the composition containing at least one volatile and/or labile component is a flavoring composition.

14. A process according to claim 13 wherein the flavoring composition contains at least one of vanilla and vanillin.

15. A process according to claim 1 wherein the composition containing at least one volatile and/or labile component is added to the mixture in an amount of from about 1 to about 20 percent by weight of the total weight of components (a), (b), (c) and (d).

16. A process according to claim 15 wherein the composition containing at least one volatile and/or labile component is added to the mixture in an amount of from about 2 to about 12 percent by weight of the total weight of components (a), (b), (c) and (d).

17. A process according to claim 1 wherein said extrusion is effected at a temperature in the range of from about 35° to about 150° C.

18. A process according to claim 17 wherein said extrusion is effected in an extruder having a plurality of zones held at differing temperatures, the first of said zones having a temperature in the range of from about 35° to about 50° C. and the last of said zones, from which the extrudate leaves the extruder, having a temperature in the range of from about 80° to about 125° C.

19. A process according to claim 1 wherein the mixture is extruded in the form of rods having a diameter in the range of about 0.3 to about 3 mm.

20. A process according to claim 1 wherein water is included in said mixture prior to extrusion thereof.

21. A process according to claim 20 wherein the quantity of water included in said mixture is sufficient to produce a moisture content of from about 5 to about 11 percent by weight in the final glassy matrix.

22. A process according to claim 20 wherein the quantity of water included in said mixture is from about 2 to about 7 percent by weight based upon the total weight of said components (a), (b), (c) and (d).

23. A process according to claim 1 wherein the extruded glassy matrix is thereafter incorporated into a dough or batter.

24. A process according to claim 1 wherein the carrier of the spray-dried composition comprises at least one of a carbohydrate, a protein, and a gum.

25. A process for encapsulation of a spray-dried composition comprising at least one volatile and/or labile component in a carbohydrate, protein, or gum matrix, which process comprises forming a mixture of said composition with:
   (a) from about 50 to about 70 percent by weight of a succinyl starch derivative having a dextrose equivalent not greater than about 2;
   (b) from about 15 to about 30 percent by weight of a maltodextrin having a dextrose equivalent in the range of from about 8 to about 12;
   (c) from about 7 to about 15 percent by weight of corn syrup solids having a dextrose equivalent in the range of from about 21 to about 30; and
   (d) from about 7 to about 15 percent by weight of a disaccharide,
   all of said percentages being based upon the total weight of said components (a), (b), (c) and (d), the composition containing at least one volatile and/or labile component being present in the mixture in an amount of from about 2 to about 12 percent by weight of the total weight of components (a), (b), (c) and (d),
   and extruding the mixture to form a glassy matrix having a glass transition temperature of at least about 40° C. and wherein the composition containing at least one volatile and/or labile component is encapsulated.

26. A glassy matrix produced by a process according to claim 1.

27. A glassy matrix produced by a process according to claim 25.

28. A glassy matrix comprising:
(a) from about 40 to about 80 percent by weight of a water-soluble, chemically-modified starch having a dextrose equivalent not greater than about 2;
(b) from about 10 to about 40 percent by weight of a maltodextrin having a dextrose equivalent in the range of from about 5 to about 15;
(c) from about 5 to about 20 percent by weight of corn syrup solids or a polydextrose having a dextrose equivalent in the range of from about 21 to about 42;
(d) from about 5 to about 20 percent by weight of a mono-or disaccharide; and
(e) a spray-dried composition containing at least one volatile and/or labile component in a carrier,
all of said percentages being based upon the total weight of said components (a), (b), (c) and (d) and wherein said glassy matrix has a glass transition temperature of at least 40° C.

29. A glassy matrix according to claim 28 wherein component (a) is present in an amount of from about 50 to about 70 percent by weight.

30. A glassy matrix according to claim 28 wherein component (a) is a succinyl starch derivative.

31. A glassy matrix according to claim 28 wherein component (a) is a derivative of starch with octenyl succinate.

32. A glassy matrix according to claim 28 wherein component (a) has a dextrose equivalent in the range of about 0.5 to about 1.5.

33. A glassy matrix according to claim 28 wherein component (b) is present in an amount of from about 15 to about 30 percent by weight.

34. A glassy matrix according to claim 28 wherein component (b) has a dextrose equivalent in the range of about 8 to about 12.

35. A glassy matrix according to claim 28 wherein component (c) is present in an amount of from about 7 to about 15 percent by weight.

36. A glassy matrix according to claim 28 wherein component (c) has a dextrose equivalent in the range of about 21 to about 30.

37. A glassy matrix according to claim 28 wherein component (d) is present in an amount of from about 7 to about 15 percent by weight.

38. A glassy matrix according to claim 28 wherein component (d) comprises a disaccharide.

39. A glassy matrix according to claim 38 wherein component (d) consists essentially of maltose.

40. A glassy matrix according to claim 28 wherein the carrier of the spray-dried composition comprises at least one of a carbohydrate, a protein, and a gum.

41. A glassy matrix according to claim 28 wherein the carrier of the spray-dried composition comprises a maltodextrin.

42. A glassy matrix according to claim 28 wherein the composition containing at least one volatile and/or labile component is a flavoring composition.

43. A glassy matrix according to claim 42 wherein the flavoring composition contains at least one of vanilla and vanillin.

44. A glassy matrix according to claim 28 wherein the composition containing at least one volatile and/or labile component is present in the matrix in an amount of from about 1 to about 20 percent by weight of the total weight of components (a), (b), (c) and (d).

45. A glassy matrix according to claim 44 wherein the composition containing at least one volatile and/or labile component is present in the matrix in an amount of from about 2 to about 12 percent by weight of the total weight of components (a), (b), (c) and (d).

46. A glassy matrix according to claim 28 in the form of rods having a diameter in the range of about 0.3 to about 3 mm.

47. A glassy matrix according to claim 28 having a moisture content of from about 5 to about 11 percent by weight.

48. A glassy matrix comprising:
(a) from about 50 to about 70 percent by weight of a succinyl starch derivative having a dextrose equivalent not greater than about 2;
(b) from about 15 to about 30 percent by weight of a maltodextrin having a dextrose equivalent in the range of from about 8 to about 12;
(c) from about 7 to about 15 percent by weight of corn syrup solids having a dextrose equivalent in the range of from about 21 to about 30;
(d) from about 7 to about 15 percent by weight of a disaccharide; and
(e) from about 2 to about 12 percent by weight of a spray-dried composition comprising at least one volatile and/or labile component in a carbohydrate, protein, or gum carrier, said composition being encapsulated within the glassy matrix,
all of said percentages being based upon the total weight of said components (a), (b), (c) and (d) and wherein said glassy matrix has a glass transition temperature of at least 40° C.

49. A process for incorporation of a spray-dried composition comprising at least one volatile and/or labile component in a carrier into a cooked food product, which process comprises:
forming a mixture of a spray-dried composition containing the at least one volatile and/or labile component with:
(a) from about 40 to about 80 percent by weight of a water-soluble, chemically-modified starch having a dextrose equivalent not greater than about 2;
(b) from about 10 to about 40 percent by weight of a maltodextrin having a dextrose equivalent in the range of from about 5 to about 15;
(c) from about 5 to about 20 percent by weight of corn syrup solids or a polydextrose having a dextrose equivalent in the range of from about 21 to about 42; and
(d) from about 5 to about 20 percent by weight of a mono-or disaccharide,
all of said percentages being based upon the total weight of said components (a), (b), (c) and (d);
extruding the mixture to form a glassy matrix wherein the spray-dried composition containing at least one volatile and/or labile component is encapsulated, and wherein said glassy matrix has a glass transition temperature of at least about 40° C.;
adding the glassy matrix to the remaining ingredients of the food product; and
cooking the resultant mixture to form the cooked food product.

50. A process according to claim 49 wherein the glassy matrix is added to the remaining ingredients while the ingredients are in the form of a dough or batter, and the dough or batter is thereafter baked to form a baked food product.

51. A process according to claim 49 wherein the extruded glassy matrix is ground before being added to the remaining ingredients of the food product.

52. A process according to claim 49 wherein the volatile and/or labile component is a flavoring component.

53. A process according to claim 52 wherein the volatile component comprises at least one of vanilla and vanillin.

54. A process for incorporation of a spray-dried composition containing at least one volatile and/or labile component in a carbohydrate or gum carrier into a baked food product, which process comprises:

forming a mixture of a spray-dried composition containing the at least one volatile and/or labile component with:
 (a) from about 50 to about 70 percent by weight of a succinyl modified starch derivative having a dextrose equivalent not greater than about 2;
 (b) from about 15 to about 30 percent by weight of a maltodextrin having a dextrose equivalent in the range of from about 8 to about 12;
 (c) from about 7 to about 15 percent by weight of corn syrup solids having a dextrose equivalent in the range of from about 21 to about 30; and
 (d) from about 7 to about 15 percent by weight of a disaccharide,
 all of said percentages being based upon the total weight of said components (a), (b), (c) and (d);
 extruding the mixture to form a glassy matrix wherein the composition containing at least one volatile and/or labile component is encapsulated, and wherein said glassy matrix has a glass transition temperature of at least about 40° C.;
 adding the glassy matrix to a dough or batter containing the remaining ingredients of the food product; and
 baking the resultant mixture to form the baked food product.

55. A cooked food product produced by a process according to claim 48.

56. A baked food product produced by a process according to claim 54.

57. A dough or batter containing a glassy matrix according to claim 28.

* * * * *